US008638698B2

(12) United States Patent
Black

(10) Patent No.: US 8,638,698 B2
(45) Date of Patent: Jan. 28, 2014

(54) FRONT END EMPLOYING PIN DIODE SWITCH WITH HIGH LINEARITY AND LOW LOSS FOR SIMULTANEOUS TRANSMISSION

(75) Inventor: Gregory R. Black, Vernon Hills, IL (US)

(73) Assignee: Motorola Mobility LLC, Libertyville, IL (US)

( * ) Notice: Subject to any disclaimer, the term of this patent is extended or adjusted under 35 U.S.C. 154(b) by 359 days.

(21) Appl. No.: 13/190,893

(22) Filed: Jul. 26, 2011

(65) Prior Publication Data

US 2013/0028147 A1     Jan. 31, 2013

(51) Int. Cl.
*H04B 7/00* (2006.01)
*H04B 1/38* (2006.01)

(52) U.S. Cl.
USPC .............. 370/297; 370/299; 370/334; 455/78

(58) Field of Classification Search
None
See application file for complete search history.

(56) References Cited

U.S. PATENT DOCUMENTS

| | | | |
|---|---|---|---|
| 6,356,536 B1 | 3/2002 | Repke | |
| 7,010,274 B2 * | 3/2006 | Choi | 455/83 |
| 7,043,285 B2 | 5/2006 | Boyle | |
| 7,075,386 B2 | 7/2006 | Kearns | |
| 7,123,884 B2 * | 10/2006 | Nakakubo et al. | 455/81 |
| 7,251,459 B2 * | 7/2007 | McFarland et al. | 455/101 |
| 7,391,283 B2 | 6/2008 | Kearns | |
| 7,499,678 B2 | 3/2009 | Shibagaki et al. | |
| 7,583,950 B2 | 9/2009 | Russell et al. | |
| 7,589,602 B2 * | 9/2009 | Poveda et al. | 333/103 |
| 7,787,831 B2 * | 8/2010 | Uejima et al. | 455/78 |
| 7,865,150 B2 * | 1/2011 | McFarland et al. | 455/78 |
| 7,904,031 B2 * | 3/2011 | Furutani et al. | 455/83 |
| 2002/0025785 A1 * | 2/2002 | Satoh et al. | 455/78 |
| 2003/0207668 A1 * | 11/2003 | McFarland et al. | 455/3.01 |
| 2005/0035824 A1 | 2/2005 | Kearns | |
| 2010/0069020 A1 * | 3/2010 | Koya et al. | 455/78 |

FOREIGN PATENT DOCUMENTS

EP     1826914 A1     8/2007

OTHER PUBLICATIONS

Patent Cooperation Treaty, International Search Report and Written Opinion of the International Searching Authority for International Application No. PCT/US2012/047116, Nov. 23, 2012, 12 pages.
Caverly, Robert H. et al.: "Distortion in p-i-n Diode Control Circuits", IEEE Transactions on Microwave Theory and Techniques, vol. MTT-35, No. 5, May 1987, pp. 492-501.
Caverly, Robert H. et al.: "Distortion in Microwave and Switches by Reverse Biased PIN Diodes", 1989 IEEE MTT-S Digest, CH2725-0/89/0000-1073$01.00, pp. 1073-1076.

* cited by examiner

*Primary Examiner* — Andrew Lee

(57) ABSTRACT

A method, transceiver integrated circuit (IC), and communications device that employs a PIN Diode switch in connection with a transceiver integrated circuit in order to provide a highly linear path for simultaneously transmitted signals in a multi-band wireless communications device. A high linearity switch (HLS) utility/controller configures the PIN diode switch for switching between dual and single transmission modes. In the dual transmission mode, both a series PIN diode and a shunt PIN diode of the switch are biased to an on-state. A first transceiver generates and simultaneously transmits different transmission signals occupying different frequency bands to at least one antenna by utilizing a highly linear circuit path that includes the series PIN diode. In single transmission mode, both diodes are biased to an off-state which allows a second transceiver to transmit a single transmission signal to at least one antenna via a switch path with a low insertion loss impact.

20 Claims, 10 Drawing Sheets

| STATE | IP3 | D1 | D2 | CTRL1 | CTRL1 | 2.7VREG |
|---|---|---|---|---|---|---|
| GSM LB Tx | >65 | OFF | OFF | 0V | 1.8V | 2.7V |
| GSM900 Rx | >65 | OFF | OFF | 0V | 0V | 2.7V |
| BC0 OR LTE | >90 | ON | ON | 1.8V | 1.8V | 2.7V |
| OTHER ACTIVE | >65 | OFF | OFF | 0V | 0V | 2.7V |
| IDLE | n/a | OFF | OFF | 0V | 0V | 0V |

FIG. 8

FRONT END EMPLOYING PIN DIODE SWITCH WITH HIGH LINEARITY AND LOW LOSS FOR SIMULTANEOUS TRANSMISSION

BACKGROUND

1. Technical Field

The present invention relates in general to wireless communications devices and in particular to transceiver radio frequency (RF) switches in wireless communications devices.

2. Description of the Related Art

Dual (or "simultaneous") transmission systems provide one type of signal transmission within a first frequency band and another type of signal transmission in a second frequency band. For example, the dual transmission system may simultaneously provide voice transmissions in the BC0 band (824-849 MHz) and data transmissions in the B13 band (777-787 MHz). However, in simultaneously transmitting systems, the two transmitters that respectively provide the voice transmissions and the data transmissions may generate intermodulation (IM) signals which fall in a receive band and desensitizes a corresponding receiver. For example, third ($3^{rd}$) order intermodulation signals are generated in the BC0 receive band (869-894 MHz) and the B13 receive band (746-756 MHz).

Intermodulation (IM) distortion occurs when the non-linearity of a device or system with multiple input frequencies causes the generation of undesired outputs at other frequencies. In a communications system, IM distortion occurs as signals in one channel cause interference with adjacent channels. As the communication spectrum becomes busier and channels become more tightly spaced, minimizing intermodulation distortion becomes more important.

In the dual transmission system, in order to prevent the $3^{rd}$ order IM signals from desensitizing either receiver by more than 1 dB, an output IP3 (i.e., third order intercept point) level of 90 dBm is needed for front-end components. The IP3 relates nonlinear products caused by a third-order nonlinear term to the linearly amplified signal and indicates how well a receiver performs in the presence of strong nearby signals. Most front-end switches, however, cannot achieve this level of linearity associated with an output IP3 level of 90 dBm for front end components. Furthermore, conventional integrated circuit-based RF switches are not available with this level of linearity (+90 dBm IP3). In the communications industry higher linearity switches and/or filters represent a major challenge and represents an area of significant focus for development/improvement for future generations of wireless communications products.

BRIEF DESCRIPTION OF THE DRAWINGS

The described embodiments are to be read in conjunction with the accompanying drawings, wherein:

FIG. 8 is a table that provides configuration information for various transmission modes/states, control signal states and diode biasing states, according to one embodiment;

DETAILED DESCRIPTION

Figure 1:
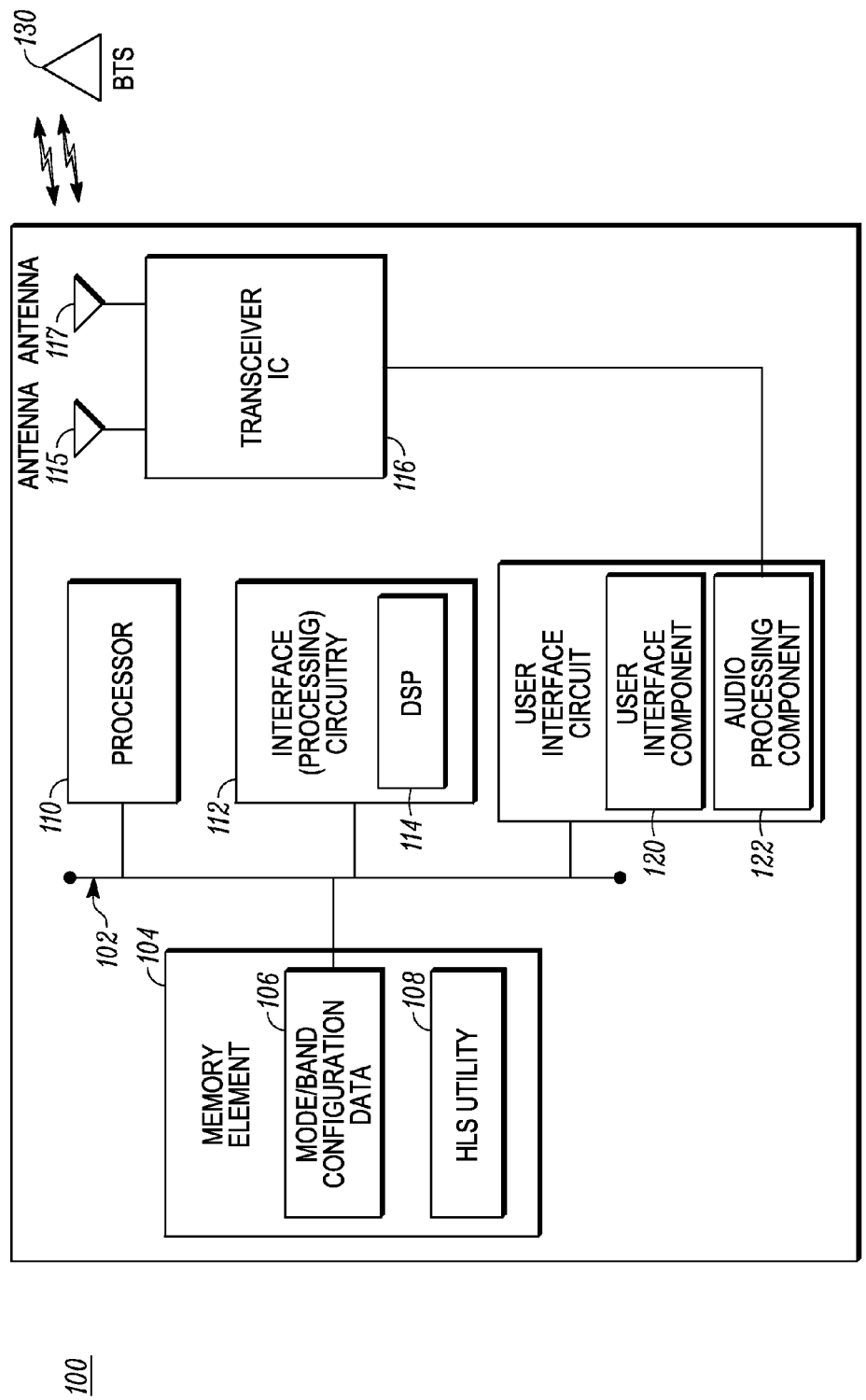
FIG. 1 illustrates an example block diagram representation of a wireless communications device, within which, features of the invention can be incorporated, according to one embodiment.

The illustrative embodiments provide a method, transceiver integrated circuit (IC), and communications device that employs a PIN Diode switch in connection with a transceiver integrated circuit in order to provide a highly linear path for simultaneously transmitted signals in a multi-band wireless communications device. A high linearity switch (HLS) utility/controller configures the PIN diode switch for switching between dual and single transmission modes. In the dual transmission mode, both a series PIN diode and a shunt PIN diode of the switch are biased to an on-state. A first transceiver generates and simultaneously transmits different transmission signals occupying different frequency bands to at least one antenna by utilizing a highly linear circuit path that includes the series PIN diode. In single transmission mode, both diodes are biased to an off-state which allows a second transceiver to transmit a single transmission signal to at least one antenna via a switch path with a low insertion loss impact.

In the following detailed description of exemplary embodiments of the invention, specific exemplary embodiments in which the invention may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present invention. The following detailed description is, therefore, not to be taken in a limiting sense, and the scope of the present invention is defined by the appended claims and equivalents thereof.

Within the descriptions of the different views of the figures, similar elements are provided similar names and reference numerals as those of the previous figure(s). The specific numerals assigned to the elements are provided solely to aid in the description and are not meant to imply any limitations (structural or functional or otherwise) on the described embodiment.

It is understood that the use of specific component, device and/or parameter names (such as those of the executing utility/logic/firmware described herein) are for example only and not meant to imply any limitations on the invention. The invention may thus be implemented with different nomenclature/terminology utilized to describe the components/devices/parameters herein, without limitation. References to any specific protocol or proprietary name in describing one or more elements, features or concepts of the embodiments are provided solely as examples of one implementation, and such references do not limit the extension of the invention to embodiments in which different element, feature or concept names are utilized. Thus, each term utilized herein is to be given its broadest interpretation given the context in which that terms is utilized including using their standard definition. For example, the term "combined transmission signal" or "dual transmission signal" may be used interchangeably with "multiple transmission signal" to represent a combination of at least two transmission signals that are simultaneously propagated to at least one antenna while at least one transceiver is in a "dual transmission mode" or "simultaneous transmission mode". The term "simultaneously propagated signal" used interchangeably with "simultaneously transmitted signal" or "simultaneous signal transmission" refers to a first transmission signal from among a group of signals which is simultaneously propagated with at least a second transmission signal. The term is applicable to situations in which (a) the first transmission signal is combined with a second transmission signal to form a "dual transmission signal" prior to the antenna input or (b) the first transmission signal is simultaneously propagated with at least the second transmission signal along different/respective paths to respective antennas (i.e., without being combined prior to an antenna input). In addition, the term "single transmission signal" represents a single signal in the device that is being propagated to an antenna while a corresponding transceiver is in a single transmission mode. Additionally, the term "carrier signal" may be used to represent any of the following: (a) a currently unmodulated carrier signal; and (b) a carrier signal that has already been modulated by an information signal.

As further described below, implementation of the functional features of the invention is provided within processing devices/structures and can involve use of a combination of hardware, firmware, as well as several software-level constructs (e.g., program code). The presented figures illustrate both hardware components and software/logic components within example wireless communications device architecture.

With specific reference now to FIG. 1, there is depicted a block diagram of an example wireless communications device 100, within which the functional aspects of the described embodiments may advantageously be implemented. For simplicity, wireless communications device 100 shall be referred to herein simply as WCD 100. In one or more embodiments, the wireless communications device can be a mobile cellular device/phone or smartphone, or laptop, netbook or tablet computing device, or other types of communications devices. In another embodiment, WCD 100 incorporates on-demand communications features including features that are closely related to or are substantially identical to walkie talkie type of communications. WCD 100 comprises processor unit 110 and interface circuitry 112 which further comprises digital signal processor (DSP) 114 (which execute routines written in executable code). Processor unit 110 and interface circuitry 112 are connected to memory element 104 via signal bus 102. WCD 100 includes a RF transceiver integrated circuit 116 for sending and receiving a communication signal including one or more signals from one or more signal initiators. In at least some embodiments, the sending and receiving of communication signals occurs wirelessly and is facilitated by one or more antennas (e.g., antenna 115 and antenna 117) coupled to the transceiver IC 116. WCD 100 is able to wirelessly communicate to base transceiver system (BTS)/base-station 130 via antenna 115/117. WCD 100 also comprises user interface circuit 118, which further comprises user interface component 120 and audio processing component 122.

In addition to the above described hardware components of WCD 100, various features of the invention may be completed/supported via software (or firmware) code or logic stored within a controller, memory 104 (or other storage) and executed by DSP 114/Processor 110. Thus, for example, illustrated within memory 104 are a number of software/firmware/logic components/modules, including transceiver mode and frequency band configuration data 106. Memory 104 also comprises HLS utility 108.

Figure 2:
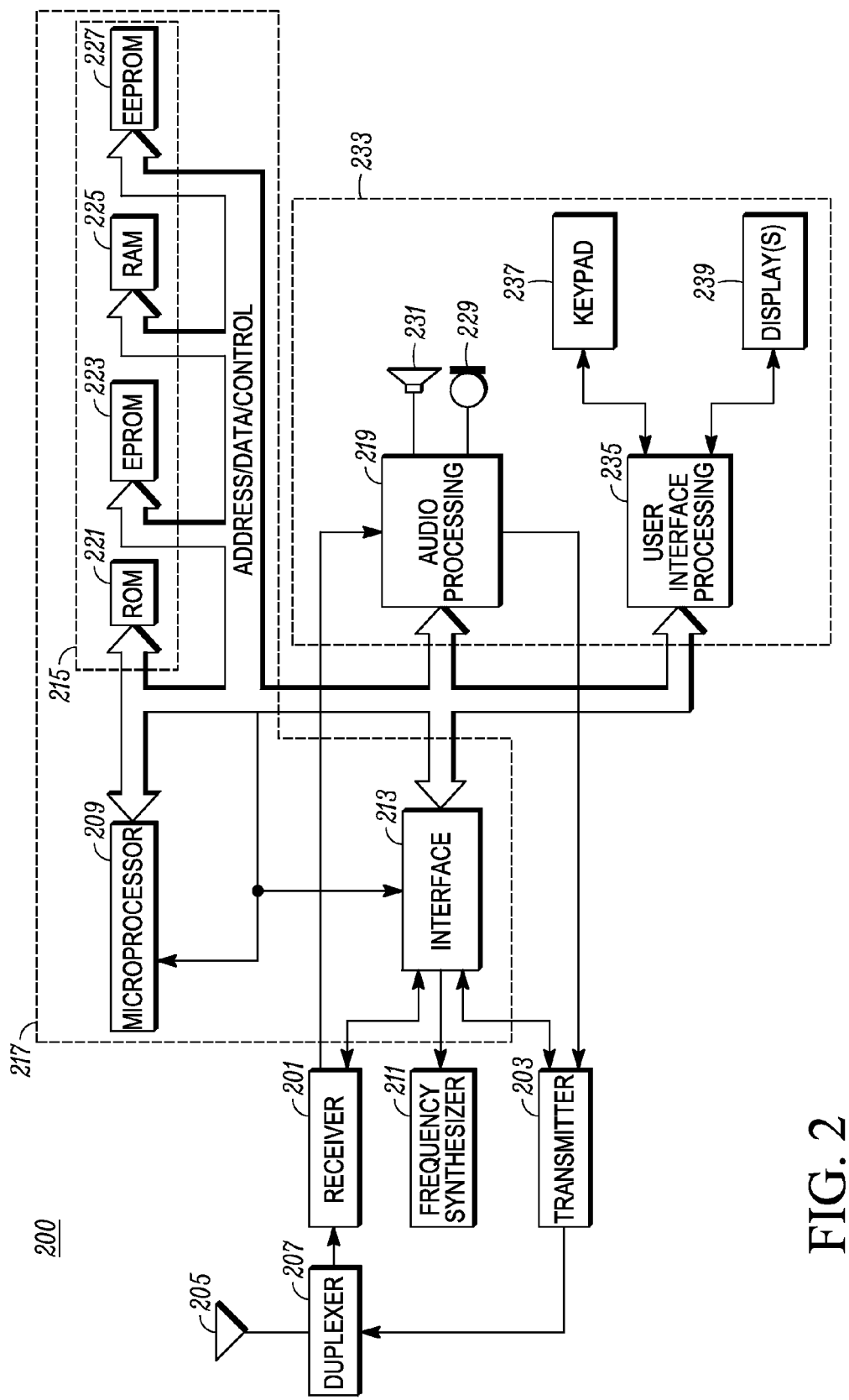
FIG. 2 illustrates a detailed view of the wireless communications device, according to one embodiment.

With reference now to FIG. 2, there is presented a more detailed view of the wireless communication device (WCD) of FIG. 1, according to one embodiment. WCD 200 includes a radio receiver 201 and a transmitter 203. Both the receiver 201 and the transmitter 203 are coupled to an antenna 205 of the wireless communication device by way of a duplexer 207. WCD 200 also includes microprocessor 209, which connects to receiver 201, transmitter 203, frequency synthesizer 211 via an interface 213. The particular radio frequency to be used by the transmitter 203 and the receiver 201 is determined by the microprocessor 209 and conveyed to the frequency synthesizer 211 via the interface circuitry 213. Data signals received by the receiver 201 are decoded and coupled to the microprocessor 209 by the interface circuitry 213, and data signals to be transmitted by the transmitter 203 are generated by the microprocessor 209 and formatted by the interface circuitry 213 before being transmitted by the transmitter 203. Operational status of the transmitter 203 and the receiver 201 is enabled or disabled by the interface circuitry 213. In one embodiment, transmitter 203 and receiver 201 may be incorporated into a single transceiver. In another embodiment, transmitter 203 and receiver 201 may collectively provide a first transceiver component of a dual transceiver (FIG. 3) that has at least two transceiver components collectively transmitting and receiving simultaneously propagated signals.

In at least one embodiment, the microprocessor 209 forms part of a processing unit 217, which in conjunction with the interface circuitry 213 performs the necessary processing functions under the control of program instructions stored in a memory section 215 to which microprocessor 209 is connected. Together, the microprocessor 209 and the interface circuitry 213 can include one or more microprocessors, one or more of which may include a digital signal processor (DSP). The memory section 215 includes one or more forms of volatile and/or non-volatile memory including conventional ROM 221, EPROM 223, RAM 225, or EEPROM 227. Identifying features of the wireless communication device are typically stored in EEPROM 227 (which may also be stored in the microprocessor in an on-board EEPROM, if available) and can include the number assignment (NAM) required for operation in a cellular communications device.

WCD 200 also comprises a user interface circuit block 233 connected to microprocessor 209 via an address/data/control bus. Audio processing circuitry 219, which forms part of the user interface circuit 233, controls user audio, the microphone 229 and the speaker 231. The user interface circuit 233 additionally includes user interface processing circuitry 235, which manages the operation of any keypad(s)/touch panel(s) 237 and/or display(s) 239. It is further envisioned that the user actuatable element for initiating an on-demand communication could be one of the keys or buttons included as part of the keypad 237.

Figure 3:
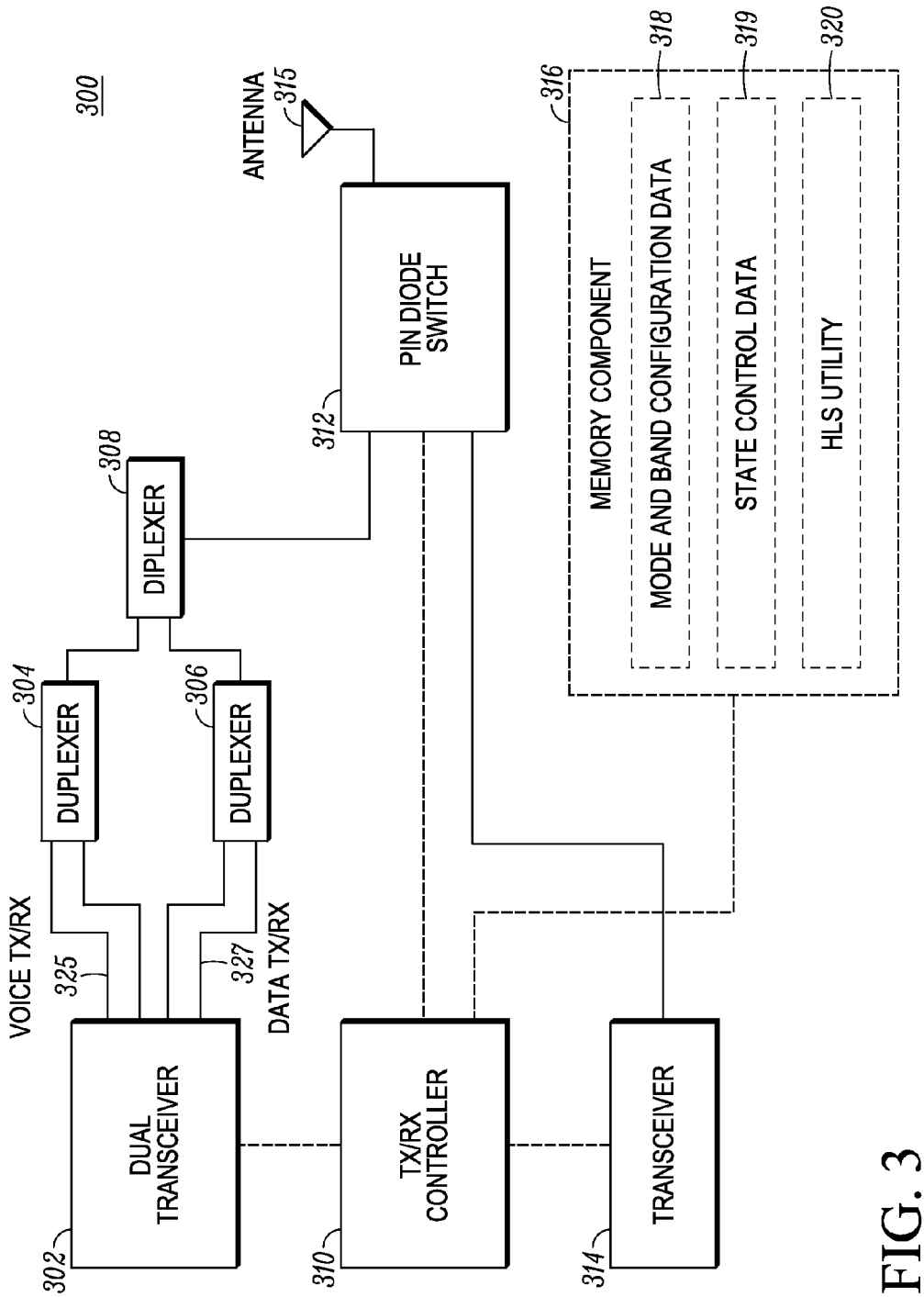
FIG. 3 illustrates a block diagram representation of RF communications components, including transceivers and a high linearity PIN diode switch, in a wireless communications device, according to one embodiment.

Turning now to FIG. 3, the RF communications components, including transceivers and a high linearity PIN diode switch, are illustrated, according to one embodiment. RF communications circuit (RFCC) 300 comprises first transceiver 302 (which in the described embodiments is a dual transceiver) that transmits and receives a plurality of different transmission signals which may include voice transmissions and data transmissions. RFCC 300 also includes single transmission mode transceiver 314 that transmits and receives a single transmission signal, while no other signal is being propagated to or from an antenna. Dual transceiver 302 is coupled to first duplexer 304 via voice transmit/receive communication line pair 325. In addition, dual transceiver 302 is coupled to second duplexer 306 via data transmit/receive communication line pair 327. First duplexer 304 and second duplexer 306 are both coupled to respective input ports of diplexer 308. Dual transceiver 302 and single (transmission mode) transceiver 314 are both coupled to Transmit-Receive (Tx/Rx) Controller 310. RFCC 300 also comprises PIN diode switch 312 that is coupled to at least one antenna, of which antenna 315 is illustrated. RFCC 300 also comprises memory component 316.

First duplexer 304 isolates transmit signals from receive signals and comprises a transmit bandpass filter to filter the first transmission signal from dual transceiver 302 to propagate a filtered first transmission signal (e.g., a voice transmission signal) in a first frequency band. Second duplexer 306 also comprises a transmit bandpass filter to filter the second transmission signal (e.g., a voice transmission signal) from the first transceiver to propagate a filtered second transmission signal in a second frequency band. First diplexer 308 receives the filtered first transmission signal and the filtered second transmission signal and combines the filtered first transmission signal and the filtered second transmission signal to propagate a combined/dual transmission signal to a first input port of PIN diode switch 312, while (active) transceivers are in dual transmission mode. In one embodiment, dual transceiver 302 comprises several transceivers including a first transceiver and a second transceiver that collectively generate the simultaneously propagated carriers.

Dual transmission mode is activated when one or more of the following occurs: (a) one or more transceivers (e.g., dual transceiver 302) generate different carrier/information signals which signals are simultaneously propagated to one or more antennas; (b) a diplexer (e.g., first diplexer 308) combines two or more simultaneously propagated signals to present a combined carrier signal to a first input port of a PIN diode switch (e.g., PIN diode switch 312); and (c) series and shunt PIN diodes are biased to an on-state to provide a highly linear propagation path to one or more of the simultaneously propagated signals that are received at the first input port of the PIN diode switch.

In one embodiment, while a transceiver (e.g., dual transceiver 302) is in a dual transmission mode, a signal transmitted via the signal path from single transmission mode transceiver 314 is attenuated by a forward/on-state bias of the shunt PIN diode within PIN diode switch 312 and a dual transceiver signal propagates between a first input port and the output port of PIN diode switch 314. While a transceiver (e.g., single transceiver 314) is in single transmission mode, a signal transmitted via the signal path from diplexer 308 is attenuated by a reverse/off-state bias of the series PIN diode within PIN diode switch 312 and a single transmission signal propagates between a second input port and the output port of PIN diode switch 312.

Pin diode based switches have been employed in transmit-receive switches in antenna switching circuits prior to the availability of integrated circuit (IC) based switches for use in transmit-receive switches in time division multiple access (TDMA) radios. PIN diodes are simple semiconductor devices construced from a layer of lightly doped intrinsic (I) semiconductor placed between a P-type and an N-type layer. IC-based switches have many semiconductor junctions, each of which is non-linear and can generate Intermodulation (IM) distortion. The non-linearity of a PIN diode can be minimized in forward bias conditions if the diode is designed to minimize resistance and maximize carrier lifetime, which necessitates the diode having a large device area and a thick I region. It may also possible to achieve the desired linearity in a reverse biased PIN diode but achieving the desired linearity in the reverse biased PIN diode requires very high reverse bias, on the order of 100V.

Figure 6:
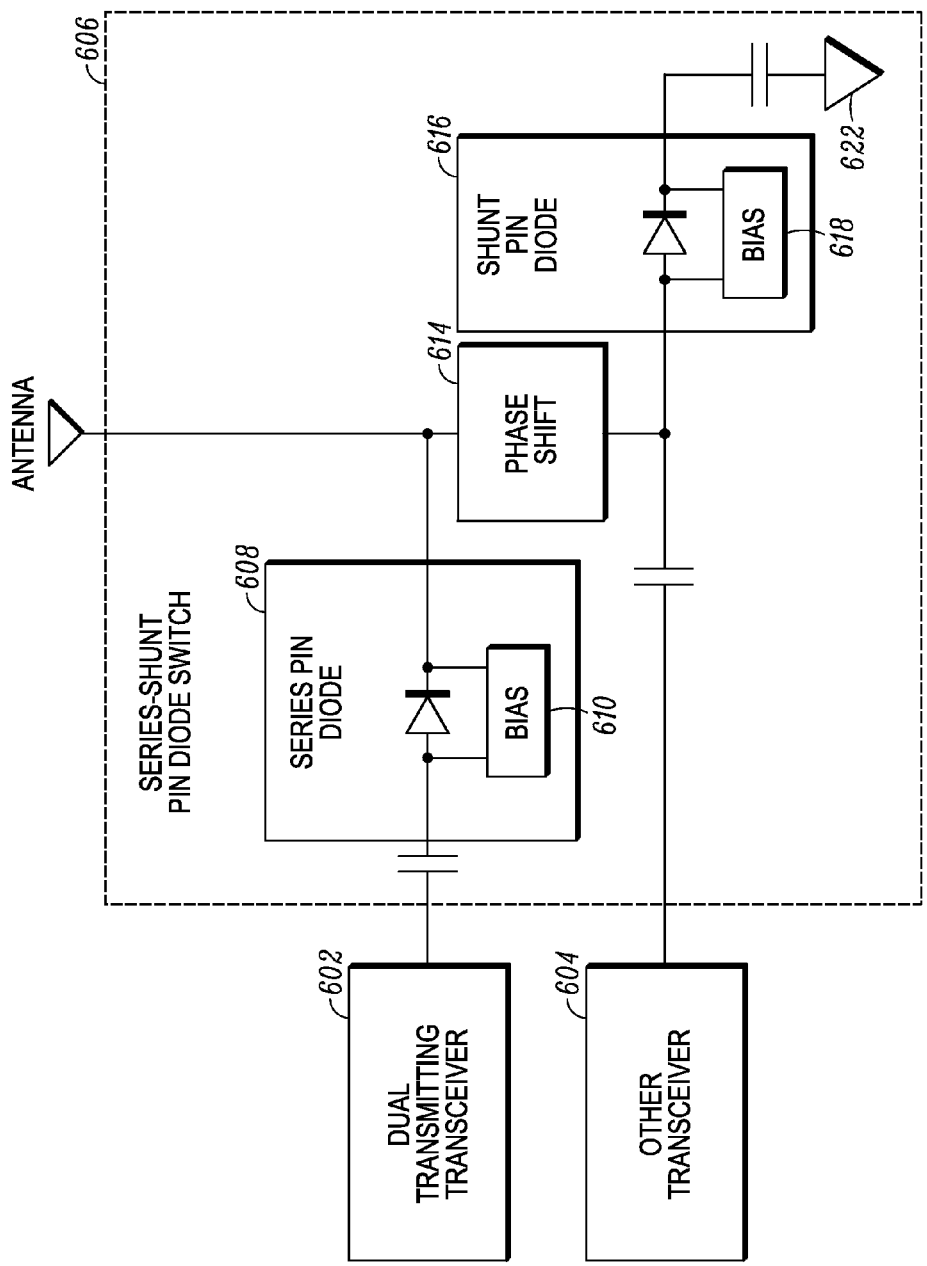
FIG. 6 illustrates RF communications components including transceivers and a series-shunt PIN diode switch, in a wireless communication device, according to one embodiment.

As illustrated by FIG. 6, which is described in more detail below, series-shunt PIN diode switch 312 comprises a series PIN diode (608 of FIG. 6) and a shunt PIN diode (616 of FIG. 6). Tx/Rx controller 310 selectively activates a dual transmission mode by biasing both the series PIN diode and the shunt PIN diode in the on-state which causes the series-shunt PIN diode switch to propagate the dual transmission signal to antenna 315 from dual transceiver 302. Tx/Rx controller 310 uses information (e.g., mode and band configuration data 318 and state control data 319) from memory component 316 to configure front end state controls, an active dual transmission mode or an active single transmission mode, and frequency bands in respective transceivers. The configured frequency bands include the first frequency band and the second frequency band in dual transceiver 302. Furthermore, in one implementation, Tx/Rx controller 310 may utilize high linearity switch (HLS) logic/utility 320 to provide functional features associated with initiation of the dual transmission mode and single transmission mode.

In the descriptions which follow, Tx/Rx controller 310 and HLS logic/utility 320 are illustrated and described as a stand-alone or separate hardware and software/firmware/logic components, which provide specific functions, as described below. In the described embodiment, HLS logic/utility 320 provides certain executable code that triggers controller 310 to perform certain functions. Additional detail of the functionality associated with HLS logic/utility 320 is presented below with reference to FIG. 4 and subsequent figures.

Certain of the functions supported and/or provided by HLS utility/logic 320 can be implemented via processing logic (or code) executed by a wireless device processor and/or other device hardware. Among the software code/instructions/logic provided by HLS utility 320, and which are specific to the described embodiment, are: (a) logic for dynamically configuring a communications device to operate in one of a plurality of transmission modes, which includes (i) a dual transmission mode to propagate signals having substantially high linearity requirements to one or more antennas, and (ii) a single transmission mode to propagate signals having lower linearity requirements to the one or more antennas; (b) logic for triggering a first transceiver to simultaneously generate different carrier signals while in a dual transmission mode; (c) logic for triggering at least one transceiver to simultaneously propagate at least two different carrier signals to one or more antennas; (d) logic for causing a diplexer to combine a first carrier signal with a second carrier signal to provide a combined/dual carrier at a first input port of a series-shunt PIN diode switch; (e) logic for triggering a single transmission mode transceiver to generate and transmit a single transmission signal to a second input port of the series-shunt PIN diode switch, while in a single transmission mode; (f) logic for selectively activating the dual transmission mode which includes triggering biasing components to bias both a series PIN diode and a shunt PIN diode of a series-shunt PIN diode switch in the on-state to cause the series-shunt PIN diode switch to propagate the dual signal via the series PIN diode to one or more antennas; and (g) logic for causing biasing components to bias both the series PIN diode and the shunt PIN diode in the off-state to cause the series-shunt PIN diode switch to propagate the single transmission signal to the the one or more antennas, in response to activation of the single transmission mode.

Figure 4:
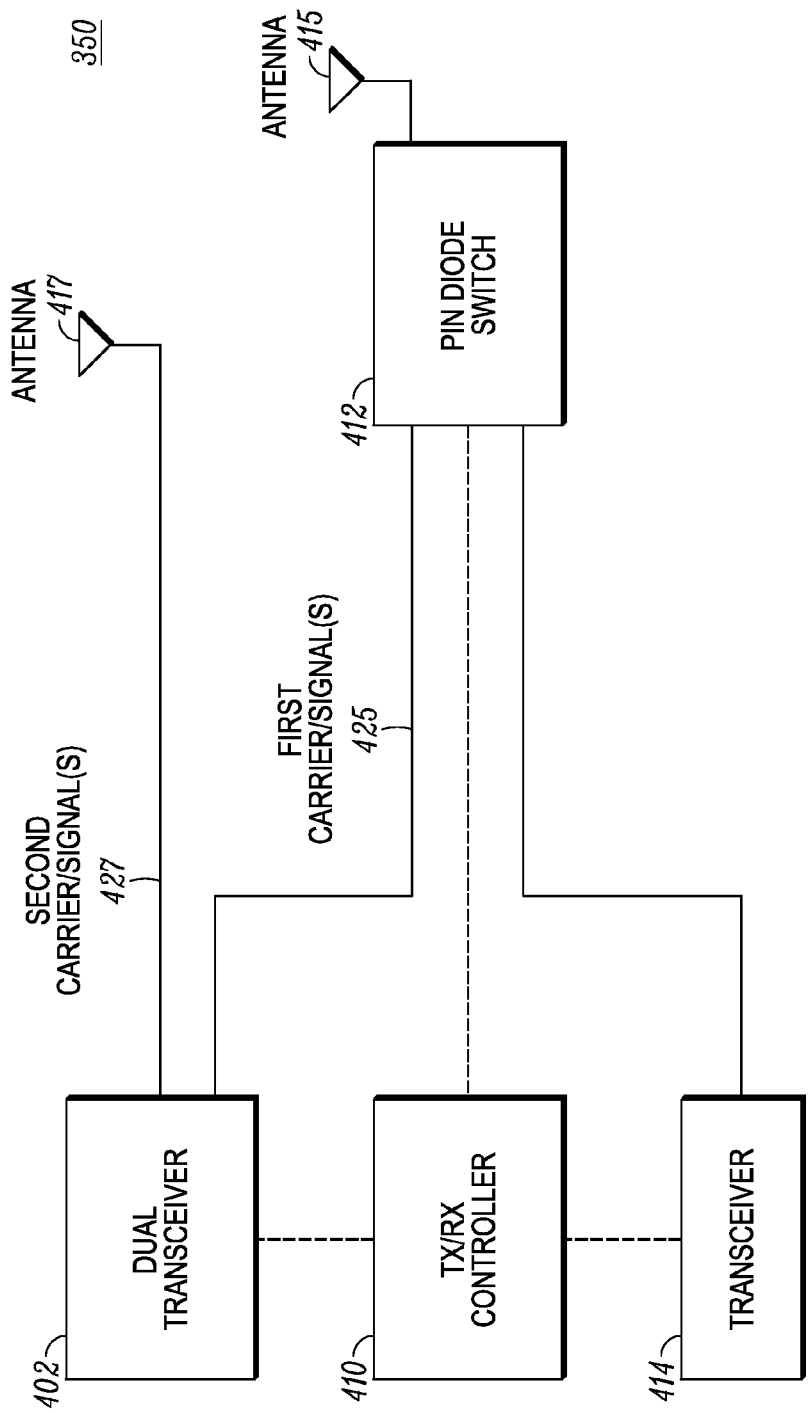
FIG. 4 illustrates RF communications components in a wireless communications device in a dual transmission mode, according to one embodiment.

FIG. 4 illustrates RF communications components in a wireless communications device in a dual transmission mode, according to one embodiment. RFCC 400 comprises dual transceiver 402 and single transmission mode transceiver 414. Dual transceiver 402 and single transceiver 414 are both coupled to Transmit-Receive (Tx/Rx) Controller 410. RFCC 400 also comprises PIN diode switch 412 that is coupled to at least one antenna, of which first antenna 415 is illustrated. RFCC 400 also comprises second antenna 417.

Dual transceiver 402 simultaneously propagates a first transmission signal/carrier 425 via a first input port of PIN diode switch 412 to a first antenna 415 and (propagates) a second transmission signal/carrier to a second antenna 417, bypassing PIN diode switch 412. Tx/Rx controller 410 selectively activates a dual transmission mode by biasing both the series PIN diode and the shunt PIN diode in the on-state to cause the series-shunt PIN diode switch to propagate the first transmission signal/carrier via series PIN diode 608 (FIG. 6) to first antenna 415 from dual transceiver 402. While in the dual transmission mode and concurrently with the propagation of the first transmission signal to first antenna 415, dual transceiver 402 transmits the second transmission signal/carrier to second antenna 417 via a path that bypasses PIN diode switch 412.

In RFCC 300 (FIG. 3), the signals are combined and propagated to an antenna via a single/common path. In RFCC 400, the signals are simultaneously transmitted along separate paths without having to be combined. However, in both RFCC 300 and RFCC 400, at least two signals are simultaneously propagated from one or more transceivers to one or more antennas. Both RFCC 300 and RFCC 400 require high linearity RF switch 312/412 to avoid the generation of intermodulation distortion (IMD) products which can desensitize a receiver. However, for switch 412 of RFCC 400 the linearity requirement is reduced (relative to the linearity requirement of switch 312) because of the isolation from antenna 417 and antenna 415.

In general, Nth order IMD levels are a function of the first and second transmit power levels, $P_{TX1}$ and $P_{TX2}$, and their intercept point, $IP_N$. Of particular concern is the odd order (i.e., N=3, N=5, etc) IMD, which causes receiver desensitization.

$$N=3: P_{IMD3}=1*P_{TX1}-2*(IP_3-P_{TX2}), \quad (1)$$

$$N=5: P_{IMD5}=2*P_{TX1}-3*(IP_5-P_{TX2}), \quad (2)$$

$$N=7: P_{IMD7}=3*P_{TX1}-4*(IP_7-P_{TX2}), \quad (3)$$

$$N=9: P_{IMD9}=4*P_{TX1}-5*(IP_9-P_{TX2}), \text{ etc.} \quad (4)$$

The maximum allowable IMD is determined by the level of interference detected at the receiver which interference causes a threshold level/amount of desensitization, e.g. 1 dB. In the case of switch 312 of RFCC 300, in one example, a $3^{rd}$ order IMD level of −112 dBm causes 1 dB of desensitization, and the transmitter power levels, $P_{TX1}$ and $P_{TX2}$, are 24 and 20 dBm respectively. Furthermore, with reference to (1), the required $IP_3$ is greater than 90 dBm. The approach of using separate antennas (i.e., antenna 415 and antenna 417) for simultaneous signal propagation in RFCC 400 enables reduction in $P_{TX}$ depending on the antenna to antenna isolation. From equations (1-4), the requirement for Nth order IMD ($P_{IMDN}$) is reduced by M dB for 1 dB $P_{TX1}$ reduction, and by M+1 dB for 1 dB $P_{TX2}$ reduction. In practice, the antenna to antenna isolation is typically 10 dB. Thus, the IP3 requirement for switch 413 of RFCC 400 is reduced by approximately 5 dB, versus the IP3 requirement for switch 312 of RFCC 300.

RFCC 400 prevents $3^{rd}$ order intermodulation signals from being generated in the (BC0 and the B13) receive bands by utilizing a front end communications design that utilizes a PIN diode switch in connection with a transceiver integrated circuit. As a result, RFCC 400 enables (a) the multiple transmission signal (i.e., the simultaneously propagated transmission signals that are combined) to be propagated to at least one antenna using a high linearity RF switch or (b) simultaneously propagated transmission signals to be transmitted along different paths to different antennas using the high linearity RF switch. The RF switch employs a series PIN diode in the path connecting the simultaneous signal transmission, and a shunt PIN diode in the path connected to the other single transmission transceivers. Both diodes are biased in an on-state in the dual transmission mode of operation to provide a high linearity switch that prevents the generation of $3^{rd}$ order intermodulation signals in the receive bands.

Figure 5:
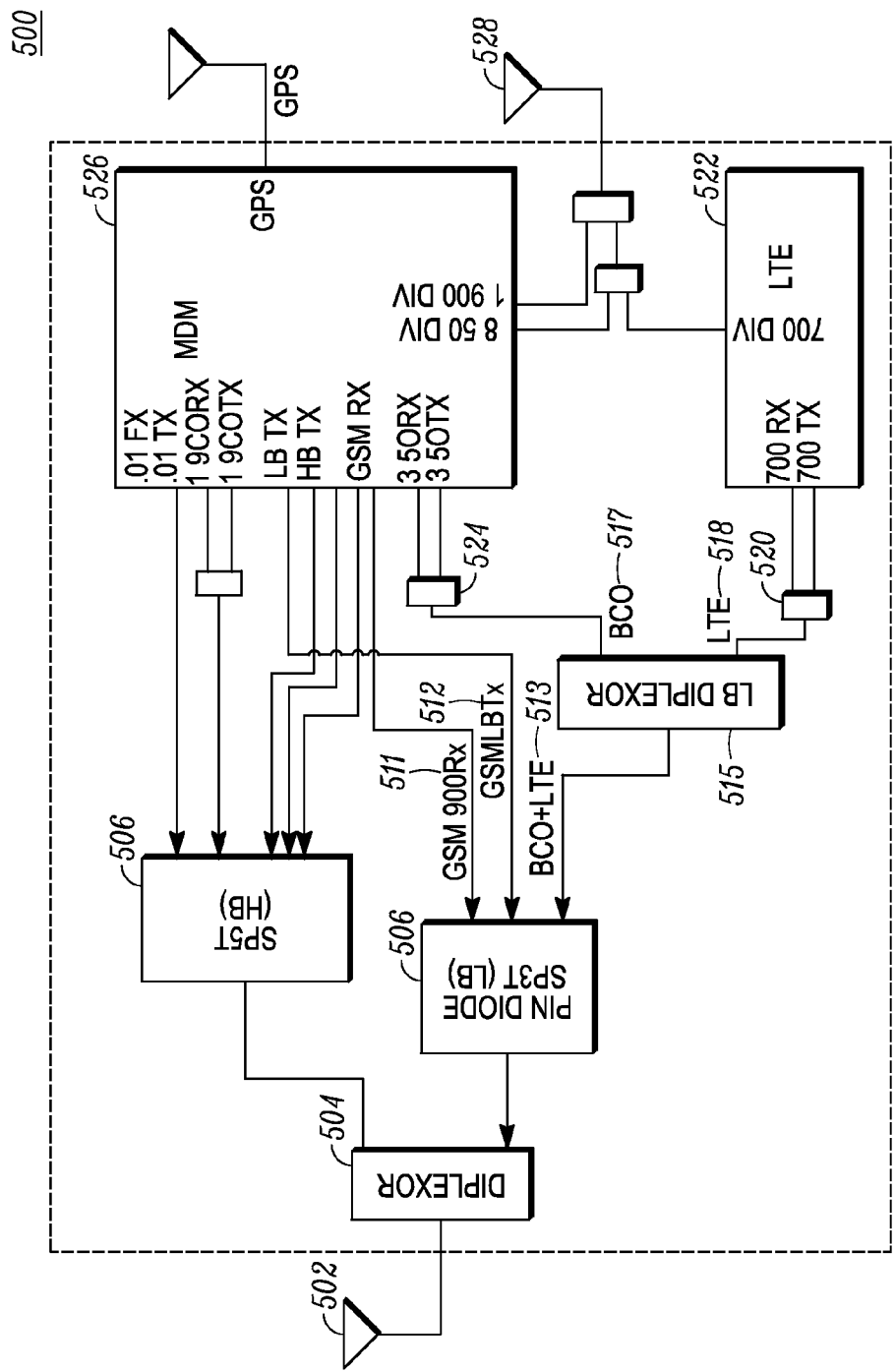
FIG. 5 illustrates another view of RF communications components, including transceivers, diplexers and a highly linear PIN diode switch, in a wireless communications device, according to one embodiment.

FIG. 5 illustrates another view of RF communications components, including transceivers, diplexers and a highly linear PIN diode switch, in a wireless communications device, according to another embodiment. RFCC 500 comprises multiple transceiver "MDM" (i.e., Mobile Digital Media) component 526 and "LTE" (i.e., Long Term Evolution) transceiver 522. In one embodiment, MDM component 526 and LTE transceiver 522 collectively provides the "dual transceiver" (e.g., 302, 402 and 602 in other figures) in dual transmission mode (or "simultaneous transmission mode"), and the "dual transceiver" functionality is described herein. MDM component 526 provides several types of the "single transmission transceiver(s)" (e.g., 314, 414 and 604), including for example, a GSM low band (LB) and high band (HB) transceivers, in single transmission mode, and the functionality of the "single transmission mode transceiver" is also described herein. RFCC 500 also comprises PIN diode single pole triple throw (SP3T) lowband (LB) switch 508 and SP5T highband (HB) switch 506. In addition, RFCC 500 comprises second diplexer 504 which is coupled to antenna 502. In dual transmission mode, multiple transceiver (MDM) component 526 transmits a BC0 transmission signal via duplexer 524 to first diplexer input 517 of first, lowband (LB) diplexer 515. LTE transceiver 522 simultaneously transmits an LTE transmission signal via duplexer 524 to second diplexer input 518. Furthermore, MDM 526 may simultaneously transmit (bypassing PIN diode switch 508) an LTE1900 transmission signal to first antenna 502. RFCC 500 may also provide simultaneous signal transmission in a dual transmission mode by utilizing first antenna 502 and second antenna 528 (which in the described embodiments is a diversity antenna). For example, in this (second) configuration for simultaneous signal transmission, an LTE transmission signal (e.g., LTE700 Tx) or a combined BC0 and LTE transmission signal may be propagated along a first path to first antenna 502 via PIN diode switch 508. Simultaneously, an LTE700 (or LTE1900) transmission signal may be propagated along a second path that does not pass through PIN diode switch 508 to second antenna 528.

LB diplexer 515 combines two of the simultaneously propagated signals. LB diplexer 515 filters the BC0 transmission signal (i.e., an example voice transmission signal) received at first diplexer input 517 into a first frequency band (e.g., 824-849 MHz). In addition, LB diplexer 515 filters the LTE transmission signal received at second diplexer input 518 into a second frequency band (e.g., 777-787 MHz). Furthermore, LB diplexer 515 combines the filtered BC0 signal and the LTE signal to generate a dual (BC0 and LTE) transmission signal 513 that is received by PIN diode SP3T lowband (LB) switch 508 via a first switch input port.

In single transmission mode, PIN diode SP3T lowband (LB) switch 508 receives GSM LB Tx signal 512 and GSM900 Rx signal 511 via respective switch input ports. At any one time, only one of these single transmission signals may be propagated to antenna 502 (or any other antenna) in single transmission mode. In the single transmission mode, SP3T switch 508 switchably connects one of the two single transmission signals to the output port of the series-shunt PIN diode switch.

Figure 7:
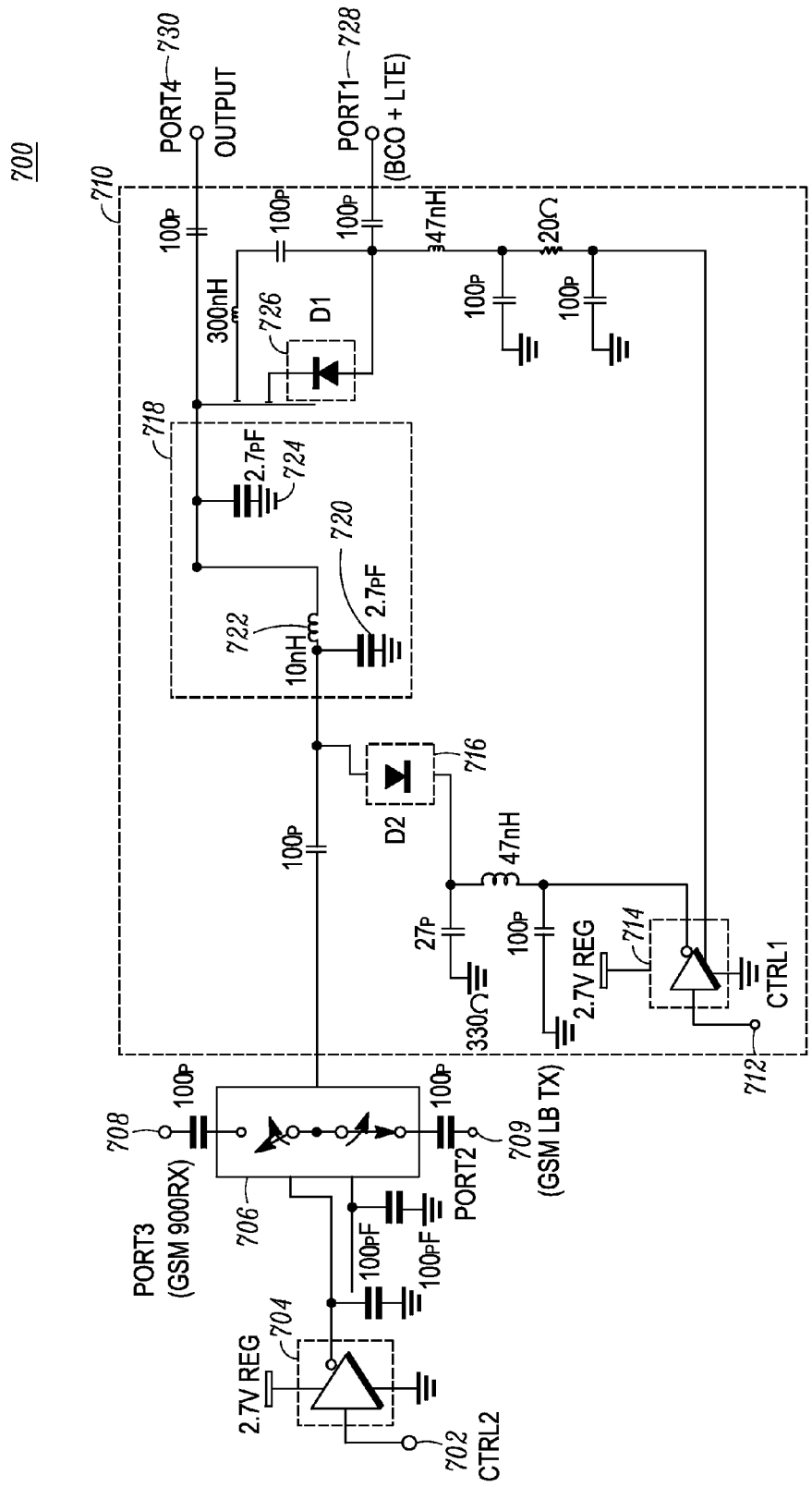
FIG. 7 illustrates a detailed view of the series-shunt PIN diode switch in a wireless communication device, according to one embodiment.

In one embodiment, as illustrated in FIG. 7, PIN diode SP3T lowband (LB) switch 508 comprises a first SPDT switch 706, and a second SPDT switch 710 that is implemented via a series-shunt PIN diode switch. The dual transmission signal or a first simultaneously transmitted signal (i.e., a signal that is simultaneously being propagated towards an antenna(s) while one or more other signals are being propagated to one or more (same or other) antennas) is received at a first port of the series-shunt PIN diode switch.

When the controller activates the dual transmission mode, PIN diode SP3T lowband (LB) switch 508 connects the first input port of PIN diode SP3T lowband (LB) switch 508 to the output port to propagate, via a highly linear circuit path, one or more of: (a) the dual transmission signal; and (b) a simultaneously propagated signal/carrier to a first input port of second diplexer 504. This highly linear circuit path (illustrated in FIG. 6) is particularly provided by the placement of the series PIN diode of PIN diode LB switch 508 in the circuit path. In dual transmission mode, second diplexer 504 filters a second simultaneously propagated transmission (HB) signal that second diplexer 504 receives at a second input port of second diplexer 504 from multiple transceiver "MDM" component 526 (via SP5T HB switch 506). In addition, second diplexer 504 filters the dual transmission signal and combines the filtered signals to propagate a combined signal comprising the dual transmission low band (LB) signal and the second simultaneously propagated transmission high band (HB) signal to (at least) antenna 502.

FIG. 6 illustrates RF communications components including transceivers and a series-shunt PIN diode switch, in a wireless communications device, according to one embodiment. RFCC 600 comprises dual transceiver 602 that transmits and receives a plurality of different transmission signals which may include voice transmissions and data transmissions, in dual transmission mode, and single transmission mode transceiver 604 that transmits and receives a single transmission signal, in single transmission mode. RFCC 600 also comprises PIN diode switch 606 that is coupled to at least one antenna, of which antenna 620 is illustrated.

In dual transmission mode, dual transceiver 602 simultaneously propagates two transmission signals as a dual transmission signal (or "combined transmission signal") via PIN diode switch 606 to one or more antennas 620, in one embodiment. In another embodiment, dual transceiver 602 simultaneously propagates at least two transmission signals as individual signals along different paths. For example, a first signal is propagated along a first path via PIN diode switch 606 to a first set of one or more antennas. A second signal is simultaneously propagated along a second path that bypasses PIN diode switch 606 to a second set of one or more antennas. In one embodiment, PIN diode switch 606 receives the dual transmission signal via a first input port of PIN diode switch 606. In the other embodiment, PIN diode switch 606 receives the first signal from among the simultaneously propagated signals via the first input port of PIN diode switch 606. In single transmission mode, single transceiver 604 propagates a single transmission signal via PIN diode switch 606 to one or more antennas 620. PIN diode switch 606 receives the single transmission signal via the second input port of PIN diode switch 506.

Series-shunt PIN diode switch 606 comprises a series PIN diode (608) and a shunt PIN diode (616). Tx/Rx controller 310 selectively activates a dual transmission mode by biasing both the series PIN diode and the shunt PIN diode in the on-state to cause the series-shunt PIN diode switch to propagate the dual transmission signal via series PIN diode (608) to one or more antennas, including antenna 620 from dual transceiver 602. In another/second embodiment, the first signal (from among the simultaneously propagated signals) is propagated via series PIN diode (608) to one or more other antennas (not explicitly shown) from dual transceiver 602. Alternatively, Tx/Rx controller 310 activates a single transmission mode by biasing both the series PIN diode and the shunt PIN diode in the off-state to cause the series-shunt PIN diode switch to propagate the single transmission signal to one or more antennas including antenna 620 from single transmission mode transceiver 604.

Tx/Rx controller 310 triggers first biasing component 610 and second biasing component 618 to bias the series PIN diode and the shunt PIN diode to on-states, respectively, in the dual transmission mode. However, in the single transmission mode, the controller triggers the first biasing component 610 and second biasing component 618 to bias the series PIN diode and the shunt PIN diode to off-states.

In RFCC 600, phase shifting component 614 is connected between an output of series PIN diode 608 and an input of shunt PIN diode 616, and provides a phase shift of a low impedance for the shunt PIN diode in the on-state to "transform" the low impedance to a high impedance at an output of the shunt diode. Providing a high impedance at the output of the shunt diode in dual transmission mode presents a high impedance path that passes through the shunt PIN diode and terminates at ground. This high impedance path is presented to (a) a combined transmission signal or (b) a single/first signal from among a plurality of simultaneously generated and propagated signals. However, in the single transmission mode, while the series PIN diode and the shunt PIN diode are both biased in the off-state, the phase shift component provides a low insertion loss impact to single transmission signals.

FIG. 7 illustrates a detailed view of the series-shunt PIN diode switch in a wireless communication device, according to one embodiment. PIN Diode Switch (PDS) 700 comprises series-shunt PIN diode switch 710 that receives, at first port 728, a dual transmission signal (e.g., a combined BC0 and LTE signal) from dual transceiver (e.g., 302, 402). Series-shunt PIN diode switch 710 is connected to a (switch) output port of single pole double throw (SPDT) switch 706. SPDT switch 706 receives a first single (type of) transmission signal (e.g., a GSM lowband transmit signal) at second port 709, and a second single transmission signal (e.g., a GSM 900 receive signal) at third port 708. Controller 310 triggers SPDT switch 706 to switchably/selectively connect one of second port 709 and third port 708 to an output port of SPDT switch 706.

Included in PDS 700 is second biasing component 704 (e.g., a power amplifier) that is powered by a regulated power source.

Series-shunt PIN diode switch 710 comprises shunt PIN diode D2 716 and series PIN diode D1 726. Series-shunt PIN diode switch 710 also comprises phase shift component 718. Phase shift component 718 comprises first shunt capacitor 720, first series inductor 722 and second shunt capacitor 724. Series-shunt PIN diode switch 710 comprises first biasing component 714 that is powered by a regulated power source (e.g., a 2.7 Volt regulated power supply). Series-shunt PIN diode switch 710 is connected to output port 730, which is connected to one or more antennas (not explicitly shown).

Referring now to FIG. 8, a table providing configuration information for various transmission modes/states, control signal states, and diode biasing states is illustrated, according to one embodiment. FIG. 8 is used to facilitate further description of PDS 700. Table 800 provides configuration states for various single transmission modes and dual transmission modes and refers, in particular, to the configuration of PDS 700 (FIG. 7). According to row 806, the dual transmission mode fulfills (based on empirical data) IP3 requirements of at least 90 dbm. A BC0 signal and an LTE signal are examples of signals occupying different frequency bands that may be propagated via simultaneous signal transmission. In one embodiment, the BC0 and LTE signal may be combined to form a dual (transmission) signal that enables both signals to be simultaneously propagated as a combined signal to a same set of one or more antennas. In another embodiment, at least two signals from among the BC0 signal, the LTE signal and another transmission signal are simultaneously propagated along different paths to respective antennas. In a particular example, a first signal (e.g., the BC0 signal) is propagated via the series PIN diode of the PIN diode switch to a first antenna. In addition, a second signal, either the LTE signal or the other individual signal, bypasses the PIN diode switch and is simultaneously transmitted along a second path to the second antenna, while the first signal is being propagated to the first antenna. As shown in row 806, in the dual transmission mode, D1 and D2 are both biased in the on-state, ctrl1 and ctrl2 are set to High and the 2.7 V regulated power supply is on. When the controller (e.g., controller 310 of FIG. 3) activates the dual transmission mode, the controller sends a first control signal via CTRL1 port 712 to biasing component 714 and a second control signal via CTRL2 port 702 to second biasing component 704 in order to bias both the series PIN diode D1 726 and shunt PIN diode 716 to on-states.

As illustrated in row 802, the IP3 requirements for GSM LB Tx, which is a single transmission signal, is at least 65 dBm. PDS 700 transmits GSM LB Tx via single transmission mode which satisfies the IP3 requirements of GSM LB Tx. In single transmission mode, the controller biases both D1 and D2 in the off-state. In the circuit configuration of FIG. 7, both diodes are biased in the off-state when at least one of the biasing control signals that comprise ctrl 1 and ctrl 2 is set to a low voltage level. Ctrl 2 is also used to trigger a switch connection via SPDT switch 706 that propagates either GSM LB Tx or GSM900 Rx to a second input port of PIN diode switch. In particular, a high voltage level signal on Ctrl 2 propagates GSM LB Tx to the second input port. A low voltage level signal on Ctrl 2 propagates GSM900 Rx to the second input port of PIN diode switch. As illustrated via row 802, since CTRL 1 is set Low and Ctrl2 is set High, both the series PIN diode and the shunt PIN diode are biased in the off state. The 2.7V regulated supply provides power to components while the device is in an active or non-idle state. In the illustrative embodiment, second input port 709 of SPDT switch 706 is connected to the output port of SPDT switch 706 causing the GSM LB TX signal to be forwarded via a (second) input port of Series-shunt PIN diode switch 710 to an antenna (not explicitly shown) connected to output port 730.

Phase shifting component (PSC) 718 is connected between an output of series PIN diode 726 and an input of shunt PIN diode 716. PSC 718 comprises one or more of: (a) a first shunt capacitor (720); (b) a first series inductor (722); and (c) a second shunt capacitor (724). Alternatively the PSC 718 may comprise a transmission line. In one embodiment, the phase shifting component 718 provides a ninety (90) degree phase shift of a complex impedance of the shunt PIN diode. In general, phase shifting component 718 provides a phase shift of a low impedance for shunt PIN diode 716 in the on-state in order to transform the low impedance to a high impedance at an output of the shunt diode. Consequently, phase shifting component 718 provides a high impedance path that passes through the shunt PIN diode and terminates at ground for (a) a combined transmission signal or (b) a first signal from among a plurality of simultaneously generated and propagated signals. However, in the single transmission mode, while the series PIN diode and the shunt PIN diode are both biased in the off-state, the phase shift component provides a low insertion loss impact to single transmission signals.

Figure 9:
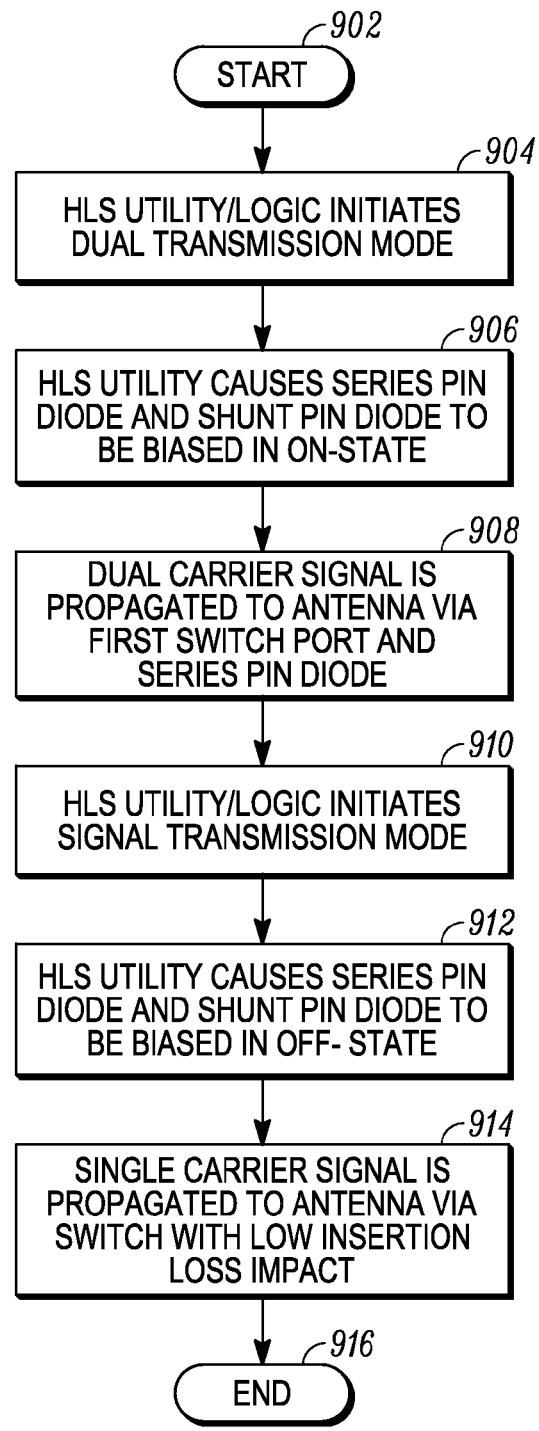
FIG. 9 is a flow chart illustrating the method for employing a PIN diode switch with high linearity for simultaneous signal transmissions and low insertion loss impact for single transmission signals, according to one embodiment.
Figure 10:
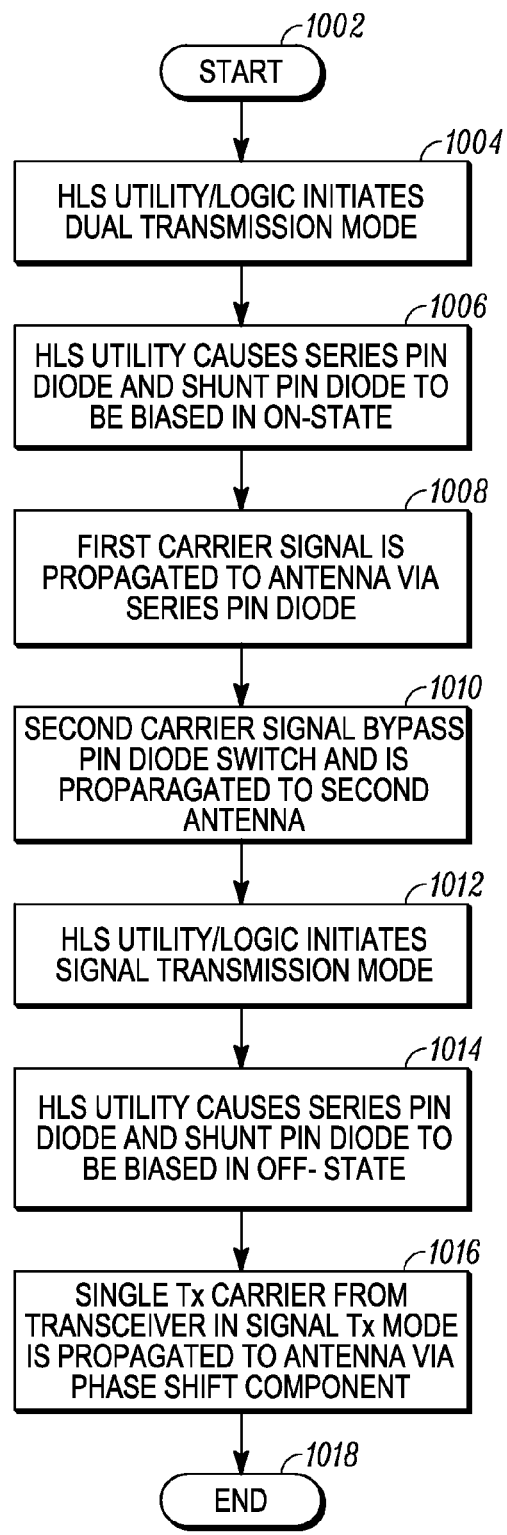
FIG. 10 is a flow chart illustrating another method for employing a PIN diode switch with high linearity for simultaneous signal transmissions and low insertion loss impact for single transmission signals, according to one embodiment.

FIGS. 9-10 are flow charts illustrating the methods by which the above processes of the illustrative embodiment are completed. Although the method illustrated in FIG. 9-10 may be described with reference to components and functionality illustrated by and described in reference to FIGS. 1-8, it should be understood that this is merely for convenience and alternative components and/or configurations thereof can be employed when implementing the various methods. Certain portions of the methods may be completed by HLS utility 108 executing on one or more processors (Processor unit 110/DSP 114/microprocessor 209) within WCD 100 (FIG. 1 or 2) or by controller 310/410. The executed processes then control specific operations of or on WCD 100. For simplicity is describing the methods, all method processes are described from the perspective of one or more of HLS utility 108/320, controller 310/410 and WCD 100.

FIG. 9 illustrates the method for employing a PIN diode switch with high linearity for simultaneous signal transmissions and low insertion loss impact for single transmission signals, according to one embodiment. The method begins at initiator block 902 and proceeds to block 904 at which HLS logic/utility 320 initiates the dual transmission mode within a wireless communications device. At block 906, HLS utility 320 triggers biasing component to bias both the series PIN diode and the shunt PIN diode of the PIN diode switch to an on-state, in response to activation of the dual transmission mode. Consequently, a dual carrier/transmission signal is propagated to one or more antennas via a first switch port and a circuit path that passes through series PIN diode, as shown at block 908. At block 910, HLS utility/logic 320 initiates a single transmission mode. HLS utility 320 causes both the series PIN diode and the shunt PIN diode of the PIN diode switch to be biased to an off-state, in response to activation of the single transmission mode, as shown at block 912. As a result, a single carrier/transmission signal is propagated to one or more antennas via the PIN diode switch with a low insertion loss impact from one or more switch components, as shown at block 914. The process ends at block 916.

FIG. 10 illustrates a second method for employing a PIN diode switch with high linearity and low insertion loss impact, according to one embodiment. The method begins at initiator block 1002 and proceeds to block 1004 at which HLS utility 320 initiates the dual transmission mode within a wireless communications device. At block 1006, HLS utility 320 causes both the series PIN diode and the shunt PIN diode of the PIN diode switch to be biased to an on-state, in response to activation of the dual transmission mode. Consequently, a first carrier signal is propagated to at least a first antenna via series PIN diode, as shown at block 1008. In addition, a second carrier/transmission signal bypasses the PIN diode switch and is propagated to a second antenna, as shown at block 1010. At block 1012, HLS utility/logic 320 initiates a single transmission mode. HLS utility 320 causes both the series PIN diode and the shunt PIN diode of the PIN diode switch to be biased to an off-state, in response to activation of the single transmission mode, as shown at block 1014. As a result, a single transmission signal (provided by a third carrier) is propagated to one or more antennas via a second switch input and a phase shifting component that provides a low insertion loss impact to the single transmission signal, as shown at block 1016. The process ends at block 1018.

The flowchart and block diagrams in the various figures presented and described herein illustrate the architecture, functionality, and operation of possible implementations of systems, methods and computer program products according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Thus, while the method processes are described and illustrated in a particular sequence, use of a specific sequence of processes is not meant to imply any limitations on the invention. Changes may be made with regards to the sequence of processes without departing from the spirit or scope of the present invention. Use of a particular sequence is therefore, not to be taken in a limiting sense, and the scope of the present invention extends to the appended claims and equivalents thereof.

In the flow chart above, one or more of the methods can be embodied in a computer readable medium containing computer readable code such that a series of steps are performed when the computer readable code is executed (by a processing unit) on a computing device. In some implementations, certain processes of the methods are combined, performed simultaneously or in a different order, or perhaps omitted, without deviating from the spirit and scope of the invention. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

While the invention has been described with reference to exemplary embodiments, it will be understood by those skilled in the art that various changes may be made and equivalents may be substituted for elements thereof without departing from the scope of the invention. In addition, many modifications may be made to adapt a particular system, device or component thereof to the teachings of the invention without departing from the essential scope thereof. Therefore, it is intended that the invention not be limited to the particular embodiments disclosed for carrying out this invention, but that the invention will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A communication device, comprising:
    at least one antenna;
    at least one transceiver switchably coupled to the at least one antenna, wherein the at least one transceiver, while operating in a dual transmission mode, generates a first carrier and at least one other carrier including a second carrier, and simultaneously propagates the first carrier and the at least one other carrier to at least one antenna;
    a series-shunt PIN diode switch comprising a series PIN diode and a shunt PIN diode, and which receives at least the first carrier at a first switch input port that is in series with the series PIN diode; and
    a controller that selectively activates the dual transmission mode by biasing both the series PIN diode and the shunt PIN diode in the on-state to cause the series-shunt PIN diode switch to propagate at least the first carrier which is transmitted via the series PIN diode to at least a first antenna.

2. The communication device of claim 1, wherein the at least one transceiver comprises a first diplexer that combines the first carrier with at least the second carrier to transmit a dual signal carrier to the first switch input port of the series-shunt PIN diode switch, which propagates, in the dual transmission mode, the dual signal carrier via the series PIN diode to the first antenna.

3. The communication device of claim 1, further comprising a second antenna of the at least one antenna that receives from the at least one transceiver at least a third carrier which bypasses the series-shunt PIN diode switch while the at least one transceiver is in dual transmission mode.

4. The communication device of claim 1 wherein:
the at least one transceiver comprises a single transmission mode transceiver that while the device is in a single transmission mode the single transmission mode transceiver generates a single transmission carrier and propagates the single transmission carrier to a second switch input port of the series-shunt PIN diode switch; and
the controller selectively activates the single transmission mode by biasing both the series PIN diode and the shunt PIN diode in the off-state and causes the series-shunt PIN diode switch to propagate the single transmission carrier to the first antenna.

5. The communications device of claim 1, further comprising:
a first duplexer coupled between a first transceiver that generates the first carrier and the first diplexer to filter the first carrier and propagate a filtered first carrier signal in a first frequency band to the first diplexer; and
a second duplexer coupled between a second transceiver that provides the second carrier and the first diplexer to filter the second carrier and propagate a filtered second carrier signal in a second frequency band to the first diplexer.

6. The communications device of claim 1, further comprising:
a phase shifting component connected between an output of the series PIN diode and an input of the shunt PIN diode and which provides a phase shift of a low impedence for the shunt PIN diode in the on-state to provide, for a simultaneously propagated signal received at the first switch input port, a high impedance path through the shunt PIN diode to ground; and
wherein said phase shifting component provides a low insertion loss impact to transmission signals while the series PIN diode and the shunt PIN diode are both biased in the off-state.

7. The communications device of claim 6;
wherein said phase shifting component comprises at least one of: (a) a first shunt capacitor; (b) a first series inductor; and (c) a second shunt capacitor.

8. The communications device of claim 1, further comprising:
a second diplexer coupled to the at least one antenna and to the series-shunt PIN diode switch, and which: receives a simultaneously propagated signal in a high frequency band from the at least one transceiver and, via the series-shunt PIN diode switch, one or more other simultaneously propagated signals from another transceiver of the at least one transceiver;
combines the simultaneously propagated signal in a high frequency band with the one or more other simultaneously propagated signals; and forwards a combined transmission signal to the at least one antenna.

9. A transceiver integrated circuit, the transceiver integrated circuit comprising:
at least one transceiver switchably coupled to at least one antenna, wherein the at least one transceiver, while operating in a dual transmission mode, generates a first carrier and at least one other carrier including a second carrier, and simultaneously propagates the first carrier and the at least one other carrier to at least one antenna;
a series-shunt PIN diode switch comprising a series PIN diode and a shunt PIN diode, and which receives at least the first carrier at a first switch input port that is in series with the series PIN diode; and
a controller that selectively activates the dual transmission mode by biasing both the series PIN diode and the shunt PIN diode in the on-state to cause the series-shunt PIN diode switch to propagate at least the first carrier which is transmitted via the series PIN diode to at least a first antenna.

10. The transceiver integrated circuit of claim 9, wherein the at least one transceiver comprises a first diplexer that combines the first carrier with at least the second carrier to transmit a dual signal carrier to the first switch input port of the series-shunt PIN diode switch, which propagates, in the dual transmission mode, the dual signal carrier via the series PIN diode to the first antenna.

11. The transceiver integrated circuit of claim 9, wherein the at least one antenna includes a second antenna that receives from the at least one transceiver at least a third carrier which bypasses the series-shunt PIN diode switch while the at least one transceiver is in dual transmission mode.

12. The transceiver integrated circuit of claim 9 wherein:
the at least one transceiver comprises a single transmission mode transceiver that while the device is in a single transmission mode the single transmission mode transceiver generates a single transmission carrier and propagates the single transmission carrier to a second switch input port of the series-shunt PIN diode switch; and
the controller selectively activates the single transmission mode by biasing both the series PIN diode and the shunt PIN diode in the off-state and causes the series-shunt PIN diode switch to propagate the single transmission carrier to the first antenna.

13. The transceiver integrated circuit of claim 9, further comprising:
a first duplexer coupled between a first transceiver that generates the first carrier and the first diplexer to filter the first carrier and propagate a filtered first carrier signal in a first frequency band to the first diplexer; and
a second duplexer coupled between a second transceiver that provides the second carrier and the first diplexer to filter the second carrier and propagate a filtered second carrier signal in a second frequency band to the first diplexer.

14. The transceiver integrated circuit of claim 9, further comprising:
a phase shifting component connected between an output of the series PIN diode and an input of the shunt PIN diode and which provides a phase shift of a low impedence for the shunt PIN diode in the on-state to provide, for a simultaneously propagated signal received at the first switch input port, a high impedance path through the shunt PIN diode to ground; and
wherein said phase shifting component provides a low insertion loss impact to transmission signals while the series PIN diode and the shunt PIN diode are both biased in the off-state.

15. The transceiver integrated circuit of claim 14:
wherein said phase shifting component comprises at least one of: (a) a first shunt capacitor; (b) a first series inductor; and (c) a second shunt capacitor.

16. The transceiver integrated circuit of claim 9, further comprising:
a second diplexer coupled to the at least one antenna and to the series-shunt PIN diode switch, and which: receives a simultaneously propagated signal in a high frequency band from the at least one transceiver and, via the series-shunt PIN diode switch, one or more other simultaneously propagated signals from another transceiver of the at least one transceiver; combines the simultaneously propagated signal in a high frequency band with the one or more other simultaneously propagated signals; and forwards a combined transmission signal to the at least one antenna.

17. In a communications device having a transceiver integrated circuit coupled to at least one antenna, a method comprising:
selectively activating a dual transmission mode by biasing both a series PIN diode and a shunt PIN diode of a series-shunt PIN diode switch in an on-state;
generating a plurality of different transmission carriers including a first carrier and at least one other carrier including a second carrier;
receiving at least the first carrier at a first switch input port that is in series with the series PIN diode; and
simultaneously propagating the first carrier via the series PIN diode and the at least one other carrier to at least a first antenna, in a dual transmission mode.

18. The method of claim 17, further comprising:
receiving the first carrier and the second carrier at a first diplexer that is coupled to the at least one transceiver; and
combining the first carrier and the second carrier to provide a combined transmission signal at an output of the first diplexer coupled a first input port of a series-shunt PIN diode switch.

19. The method of claim 17, further comprising:
dynamically configuring the device, via the series-shunt PIN diode switch, to operate in one of a plurality of transmission modes that comprises (a) a dual transmission mode to propagate signals having substantially high linearity requirements to the one or more antennas, and (b) a single transmission mode to propagate single transmission signals having lower linearity requirements to the one or more antennas;
activating the single transmission mode by biasing both the series PIN diode and the shunt PIN diode in an off-state;
receiving, at a second input port of the series-shunt PIN diode switch, a single transmission signal from a single transmission mode transceiver;
in response to activation of the single transmission mode, biasing both the series PIN diode and the shunt PIN diode in the off-state to cause the series-shunt PIN diode switch to propagate the single transmission signal to the one or more antennas.

20. The method of claim 17, further comprising:
in response to activation of the dual transmission mode: providing to one or more simultaneously propagated signals a high impedance path that passes through the shunt PIN diode and terminates at ground; and bypassing the high impedance path and propagating one or more simultaneously propagated signals to the one or more antennas via the series PIN diode.

* * * * *